(12) United States Patent
Steinwagner

(10) Patent No.: US 7,984,113 B2
(45) Date of Patent: Jul. 19, 2011

(54) SYSTEM AND METHOD FOR PASSING MESSAGES TO A WEB BROWSER

(75) Inventor: Matthias Ulrich Steinwagner, Wiesloch (DE)

(73) Assignee: SAP AG, Walldorf (DE)

( * ) Notice: Subject to any disclaimer, the term of this patent is extended or adjusted under 35 U.S.C. 154(b) by 1019 days.

(21) Appl. No.: 10/935,419

(22) Filed: Sep. 8, 2004

(65) Prior Publication Data

US 2006/0075107 A1    Apr. 6, 2006

(51) Int. Cl.
*G06F 15/16*    (2006.01)

(52) U.S. Cl. ........ 709/219; 709/203; 709/206; 709/232; 709/236; 709/248

(58) Field of Classification Search ............ 711/106, 711/118; 707/8, 104, 1, 200, 201; 709/203, 709/206, 207, 219, 232, 236, 248
See application file for complete search history.

(56) References Cited

U.S. PATENT DOCUMENTS

| | | | |
|---|---|---|---|
| 5,410,646 A | | 4/1995 | Tondevold et al. |
| 5,842,216 A | * | 11/1998 | Anderson et al. .............. 707/203 |
| 5,852,717 A | * | 12/1998 | Bhide et al. .................... 709/203 |
| 6,026,413 A | * | 2/2000 | Challenger et al. ........... 707/202 |
| 6,029,175 A | * | 2/2000 | Chow et al. ................. 707/104.1 |
| 6,138,158 A | * | 10/2000 | Boyle et al. .................... 709/225 |
| 6,256,712 B1 | * | 7/2001 | Challenger et al. ........... 711/141 |
| 6,457,009 B1 | * | 9/2002 | Bollay ........................... 707/770 |
| 6,742,059 B1 | * | 5/2004 | Todd et al. ....................... 710/19 |
| 6,745,230 B1 | | 6/2004 | Cao et al. |
| 6,915,341 B2 | * | 7/2005 | McGee et al. ................. 709/223 |
| 7,007,028 B2 | * | 2/2006 | Rashid et al. ......................... 1/1 |
| 7,039,708 B1 | * | 5/2006 | Knobl et al. ................... 709/227 |
| 7,062,530 B2 | * | 6/2006 | Scheinkman ................. 709/203 |
| 7,110,962 B2 | * | 9/2006 | Amon et al. ................ 705/14.73 |
| 7,228,353 B1 | * | 6/2007 | Franceschelli et al. ........ 709/229 |
| 7,318,165 B2 | * | 1/2008 | Fricanco et al. .............. 713/400 |
| 7,350,149 B1 | * | 3/2008 | Franceschelli et al. ........ 715/736 |
| 7,627,658 B2 | * | 12/2009 | Levett et al. ................... 709/223 |
| 7,640,512 B1 | * | 12/2009 | Appling ......................... 715/771 |
| 2002/0013711 A1 | | 1/2002 | Ahuja et al. |

(Continued)

FOREIGN PATENT DOCUMENTS

EP    1416698 A1    5/2004

(Continued)

OTHER PUBLICATIONS

IBM, "Timestamp method for notifying content match in pull-based web content distribution system", Apr. 2002, Derwent-week 200737, pp. 1-8.*

(Continued)

*Primary Examiner* — Kamal B Divecha
(74) *Attorney, Agent, or Firm* — Kenyon & Kenyon LLP

(57) ABSTRACT

A method and system for passing messages to a Web browser. According to one embodiment, a controller receives one or more messages to be delivered to a Web browser session, provides notification to the Web browser session of the receipt of the one or more messages, receives a request by the Web browser session for the one or more messages in response to the notification, the request received via a connection opened by the Web browser session, and delivers the one or more messages to the Web browser session via the connection in response to the request.

22 Claims, 8 Drawing Sheets

U.S. PATENT DOCUMENTS

| | | |
|---|---|---|
| 2002/0131561 A1 | 9/2002 | Gifford et al. |
| 2003/0221068 A1* | 11/2003 | Tsuji et al. ............... 711/126 |
| 2004/0103199 A1* | 5/2004 | Chao et al. ............... 709/228 |
| 2004/0148444 A1* | 7/2004 | Thomas et al. ............ 710/44 |

FOREIGN PATENT DOCUMENTS

| | | |
|---|---|---|
| WO | WO 03/061213 A1 | 7/2003 |
| WO | WO 03/083603 A2 | 9/2003 |

OTHER PUBLICATIONS

Alesky et al., "Design and implementation of a bridge between CORBA's notification service and the java message service," System Sciences, 2003, Proceedings of the 36th Annual Hawaii International Conference on Jan. 6-9, 2003, Piscataway, NJ, USA, IEEE, Jan. 6, 2003, pp. 318-326, XP010626775, ISBN: 0-7695-1874-5.

* cited by examiner

SYSTEM AND METHOD FOR PASSING MESSAGES TO A WEB BROWSER

BACKGROUND OF THE INVENTION

Software applications utilize messaging to exchange information with other applications. Messaging generally simplifies communication across different programming environments, since applications in each environment need only understand a common messaging format and protocol. Messaging platforms typically employ a messaging server or controller to handle the formal exchange of event notification, requests, or replies between applications.

Messaging platforms exist for all types of software applications. Among these application types are the growing number of Web-based applications, which allow users to interact with applications from across a network at the frontend via their Web browsers, instead of through traditional standalone application GUIs or client/server application GUIs.

Within such Web-based applications, while it is relatively straightforward for a Web browser session to pass messages to a backend application over the Internet using the HTTP protocol, the same cannot be said for passing messages from the backend to the Web browser session because Web browsers cannot be directly addressed by HTTP requests. As a result, developers of Web-based applications rely on messaging platforms such as the Java Message Service (JMS), which is a messaging standard API that allows application components based on the Java 2 Platform, Enterprise Edition (J2EE) to create, send, receive, and read messages. Messaging vendors implementing the JMS API typically utilize socket connections to pass messages from the backend application to the Web browser.

Unfortunately, addressing socket connections is more complex than addressing HTTP requests, and many socket connections become lost and do not provide an adequate level of security. Additionally, utilizing such connections through the JMS requires the installation of new or updated J2EE solutions and/or the Java Runtime Environment (JRE).

Accordingly, there is a need in the art for a more straightforward and secure system and method for passing messages to a Web browser.

DETAILED DESCRIPTION

In accordance with the present invention, a more straightforward and secure way for passing messages from a backend session to a Web browser session may be accomplished by having a backend controller first notify a Web browser session that messages are waiting, and as a result having the Web browser session open the connection to the backend session to retrieve the messages.

Figure 1:
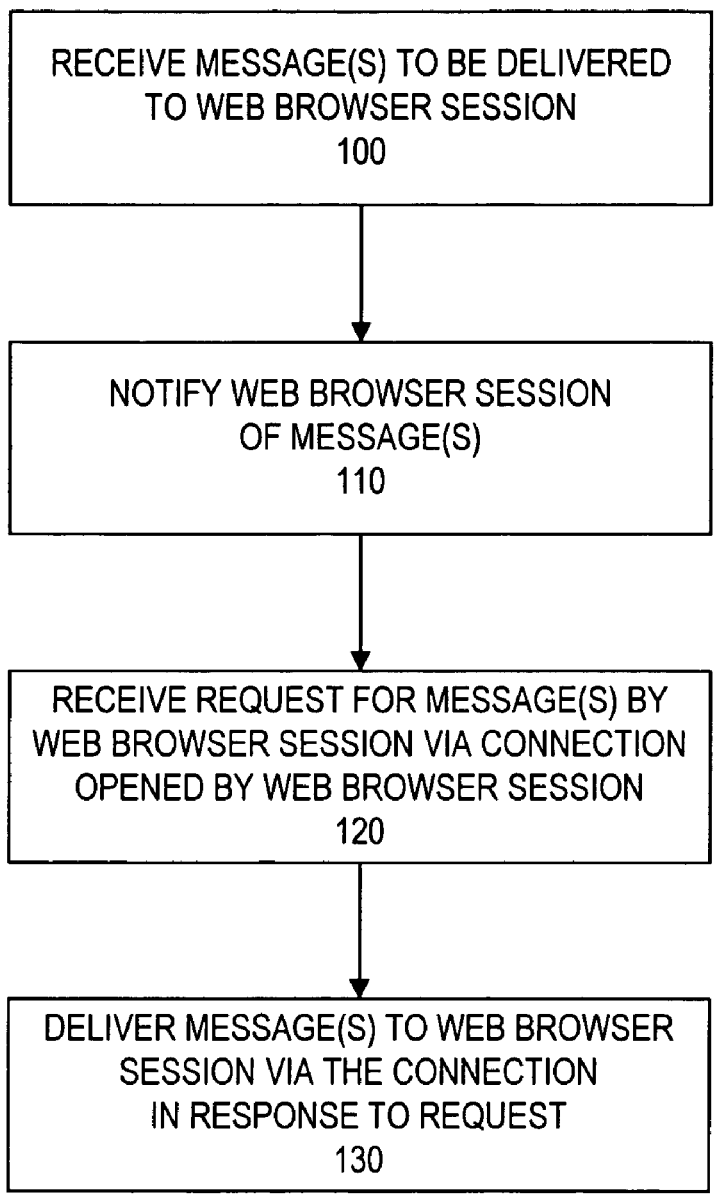
FIG. 1 is a flowchart that depicts a process for passing messages to a Web browser in accordance with an embodiment of the present invention.

FIG. 1 depicts such a process in accordance with an embodiment of the present invention. When a backend controller receives one or more messages to be delivered to a Web browser session (step 100), it provides a notification to the Web browser session of the receipt of the one or more messages (step 110). The backend controller then receives a request by the Web browser session for the one or more messages in response to the notification via a connection opened by the Web browser session (step 120), and the backend controller responds to the request by delivering the one or more messages to the Web browser session via the open connection (step 130).

Figure 2:
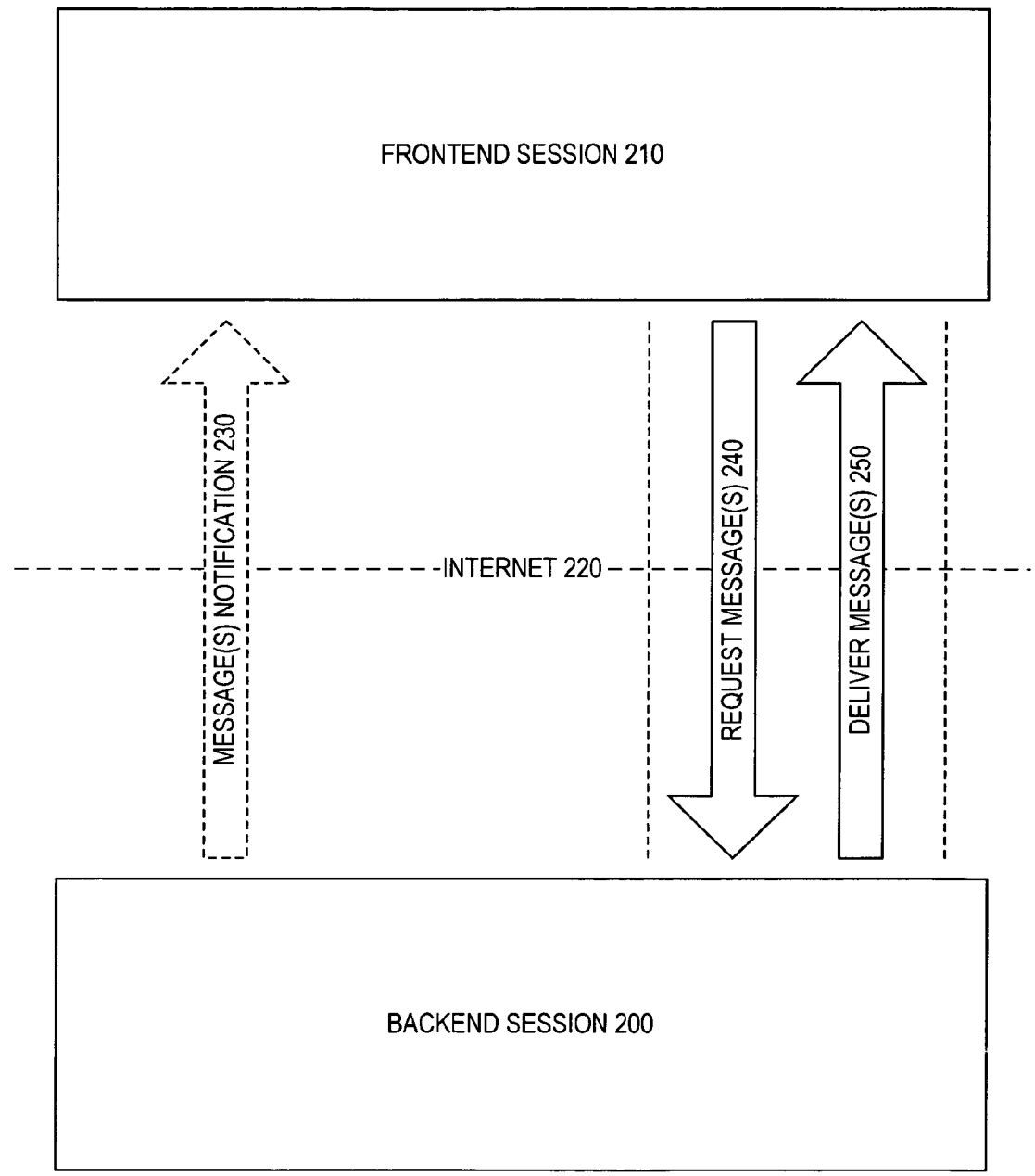
FIG. 2 is a block diagram that depicts a message passing protocol between a frontend session and backend session in accordance with an embodiment of the present invention.

As further illustrated in FIG. 2 according to one embodiment of the present invention, a session in a backend system (backend session 200) may implement the passing of one or more messages over the Internet (220) to a session in a Web browser (frontend session 210) by first providing a notification (230) to the Web browser session. Since it is more straightforward for the Web browser session to access a backend system session via the HTTP protocol, the notification could be effected via a polling mechanism in which the Web browser session continually monitors a value (e.g., a timestamp) at the backend via HTTP requests, and whereby any change in the value would indicate to the Web browser session that one or more messages are waiting to be delivered. Once the notification is effected, the Web browser session may open a connection to the backend system session by issuing an HTTP request (240), to which the backend system session may deliver any waiting messages as part of the response to the HTTP request via the same open connection (250).

By having the Web browser session ask the backend system session for the messages by opening a connection via an HTTP request, the backend system session is able to pass the messages to the Web browser session without using complicated and unreliable messaging protocols (such as socket connections via JMS) but rather using the standard HTTP protocol. Further, the standard HTTPS protocol may be used to enhance security.

Backend to Frontend Embodiment

Figure 3:
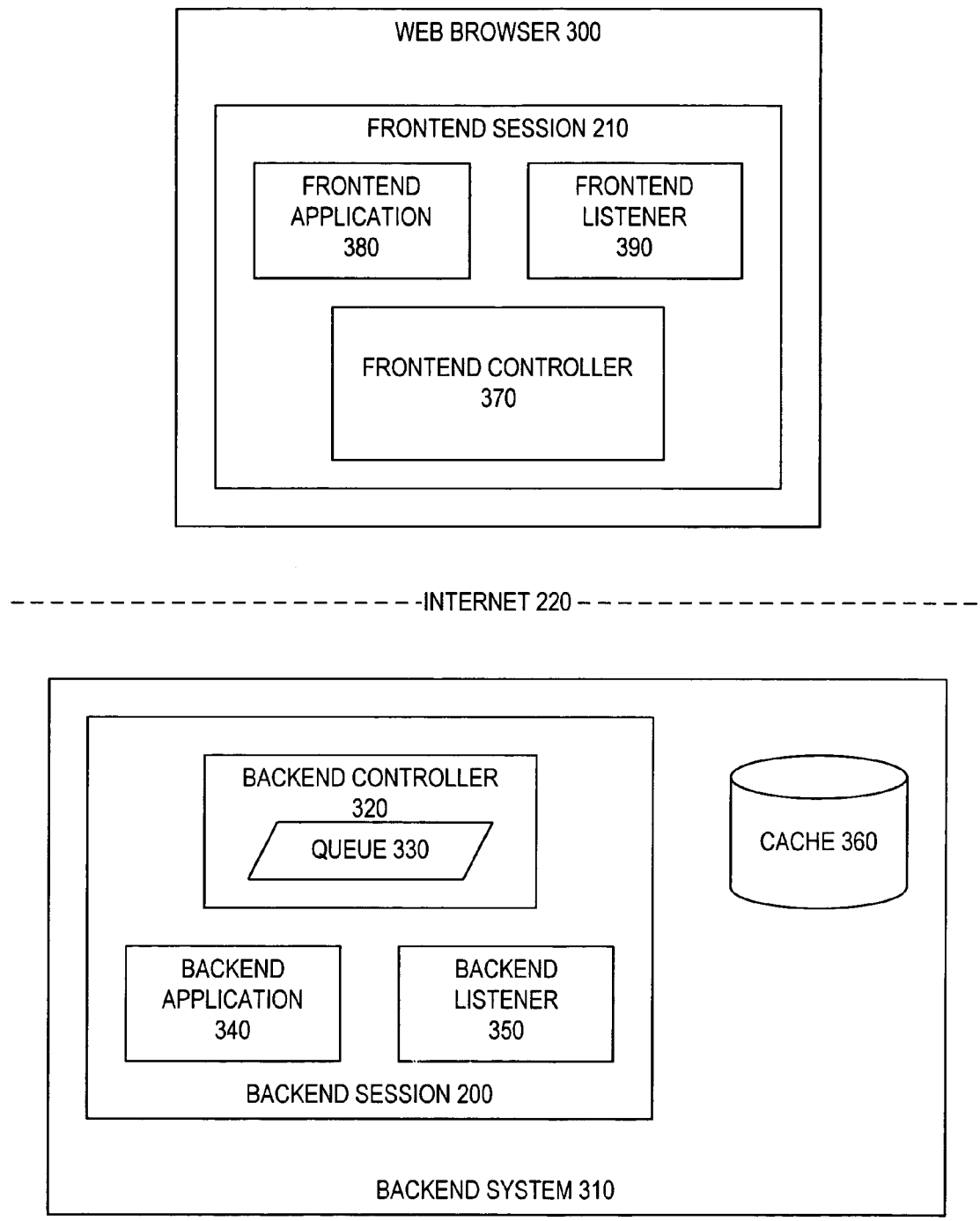
FIG. 3 is a block diagram that depicts a backend system and Web browser in accordance with an embodiment of the present invention.
Figure 4:
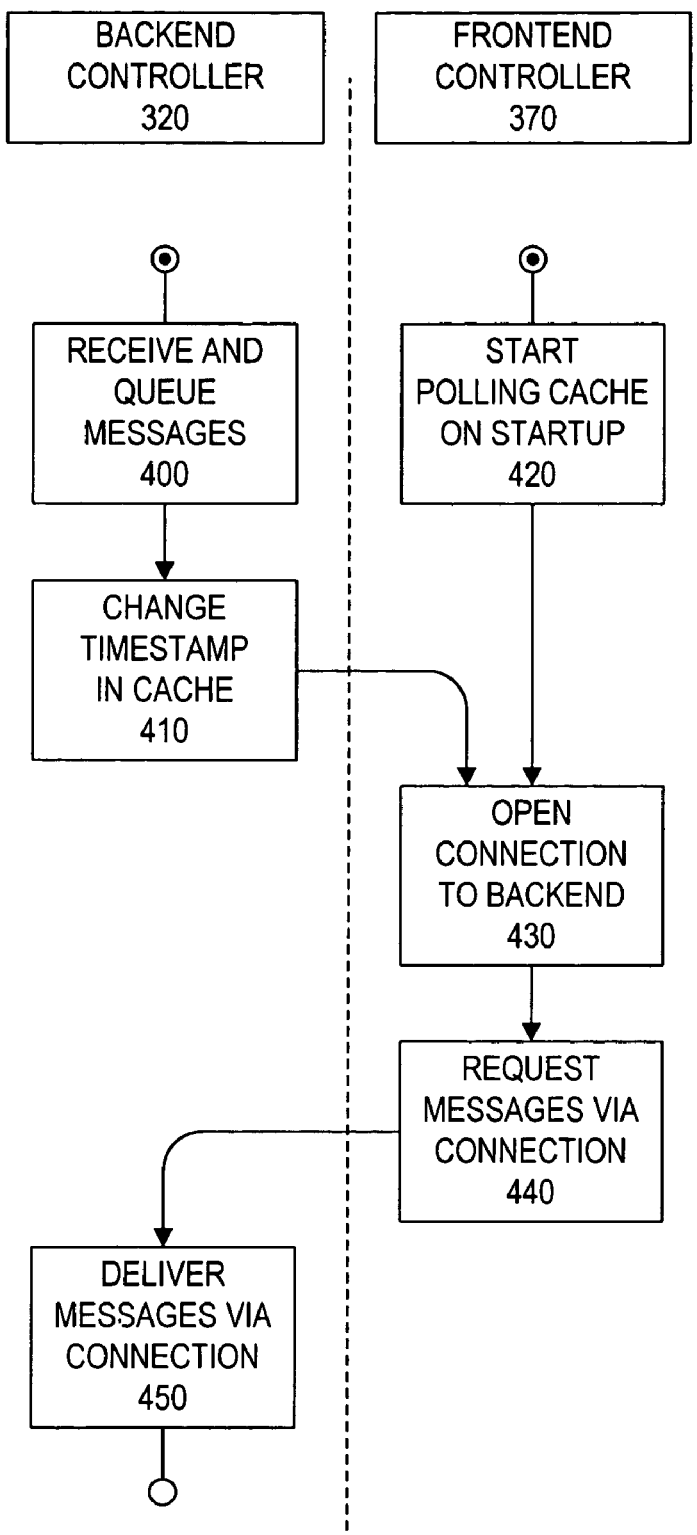
FIG. 4 is a sequence diagram that depicts a message passing protocol between a backend system and Web browser in accordance with an embodiment of the present invention.

FIGS. 3 and 4 depict a detailed view of a backend to frontend messaging embodiment of the present invention. FIG. 3 shows a Web browser (300) and a backend system (310). Backend system 310 includes a cache (360) and a backend session (200) comprising a backend messaging controller (320) with a queue (330), a backend application (340) and a backend listener (350). Web browser 300 includes a frontend session (210) comprising a frontend messaging controller (370), a frontend application (380) and a frontend listener (390).

As depicted in FIG. 4, backend controller 320 receives one or more messages and holds them in queue 330 (step 400). The messages, which may comprise any information such data in the form of text, bytes and/or objects, may originate from backend application 340, a backend application in a different backend session or a different frontend session in a different Web browser, for example. Now that messages have arrived, backend controller 320 may call a function module that updates a specific entry (e.g., a timestamp) in cache 360, which may be a database table entry or memory reference, for example (step 410). Meanwhile, frontend controller 370 may commence polling cache 360 on startup (step 420) with HTTP requests that return with the current value of the cache entry. When frontend controller 370 determines that a returned cache entry value has changed from that of the previous polling cycle, it open a connection to backend session 200 (step 430) by sending an HTTP request to backend session 200 via that connection (step 440). In response to that HTTP request, backend controller 320 delivers the messages via the connection in the response to the HTTP request.

Backend controller 320 and frontend controller 370 may implement these message exchange services by including a lavascript API that embodies the messaging functionality of the present invention. For example, in step 440, frontend controller 370 may request the messages by creating it's own message with the code:

var message=new TextMessage( );
message.setText("Hi Backend. Send me my messages");
message.setStringProperty("navigator.appCodeName", navigator.appCodeName);
message.setStringProperty("navigator.appName", navigator.appName);
message.setStringProperty("navigator.appVersion", navigator.appversion);

Frontend controller 370 can then instantiate a sender object to send the message to the backend with the following code:

var sender=new SessionQueueSender(backendQueue);
sender.send(message);

where "backendQueue" is the URL of backend session 200. The message may include additional properties indicating that new messages are requested.

To send the message, the included lavaScript API may declare an IFRAME to create the HTTP request for transferring the message to the backend. To accomplish this, the included JavaScript API first accesses the IFRAME's DOCUMENT-Object and dynamically creates a FORM in the DOCUMENT-Object. Next the message may be serialized into the FORM by dynamically appending FORMFIELDS (name-value pairs) to the FORM, which then contains the payload of the message (text, properties and messaging framework related values). If all FORMFIELDS have been appended to the FORM, the FORM may be submitted, causing the IFRAME to send an HTTP request to the URL of the backend session ("backendQueue"). Within this request, all FORMFIELDS are posted to backend controller 320 in backend session 200.

In step 450, with a direct channel now open from frontend session 210 to backend session 310, backend controller 320 may now read the posted FORMFIELDS from the HTTP request and deserialize the message. The messaging framework related values in the message may instruct backend controller 320 how to proceed: either to forward new messages to frontend controller 370, forward the message to backend listener 350 (e.g., to pass the message directly to backend application 340), or forward the message to a different frontend session, for example.

In this particular embodiment, backend controller 320 prepares an HTML page including the messages from queue 330 (serialized via JavaScript, for example). Then, backend controller 320 sets this page as the response of the HTTP request from the IFRAME. With the response, the HTML page then arrives at the IFRAME of frontend session 210, and the IFRAME starts to render the page. (Since the IFRAME is invisible, this is not noticeable for the user). The page may be prepared with an onLoad-event, which starts a JavaScript function once the page has loaded in the IFRAME. The JavaScript function may then transfer the one or more messages from the IFRAME into frontend controller 370 on the PARENT document (via cross-frame-scripting). The one or more messages may then be either queued or forwarded to frontend listener 390.

Frontend to Frontend Embodiment

Figure 5:
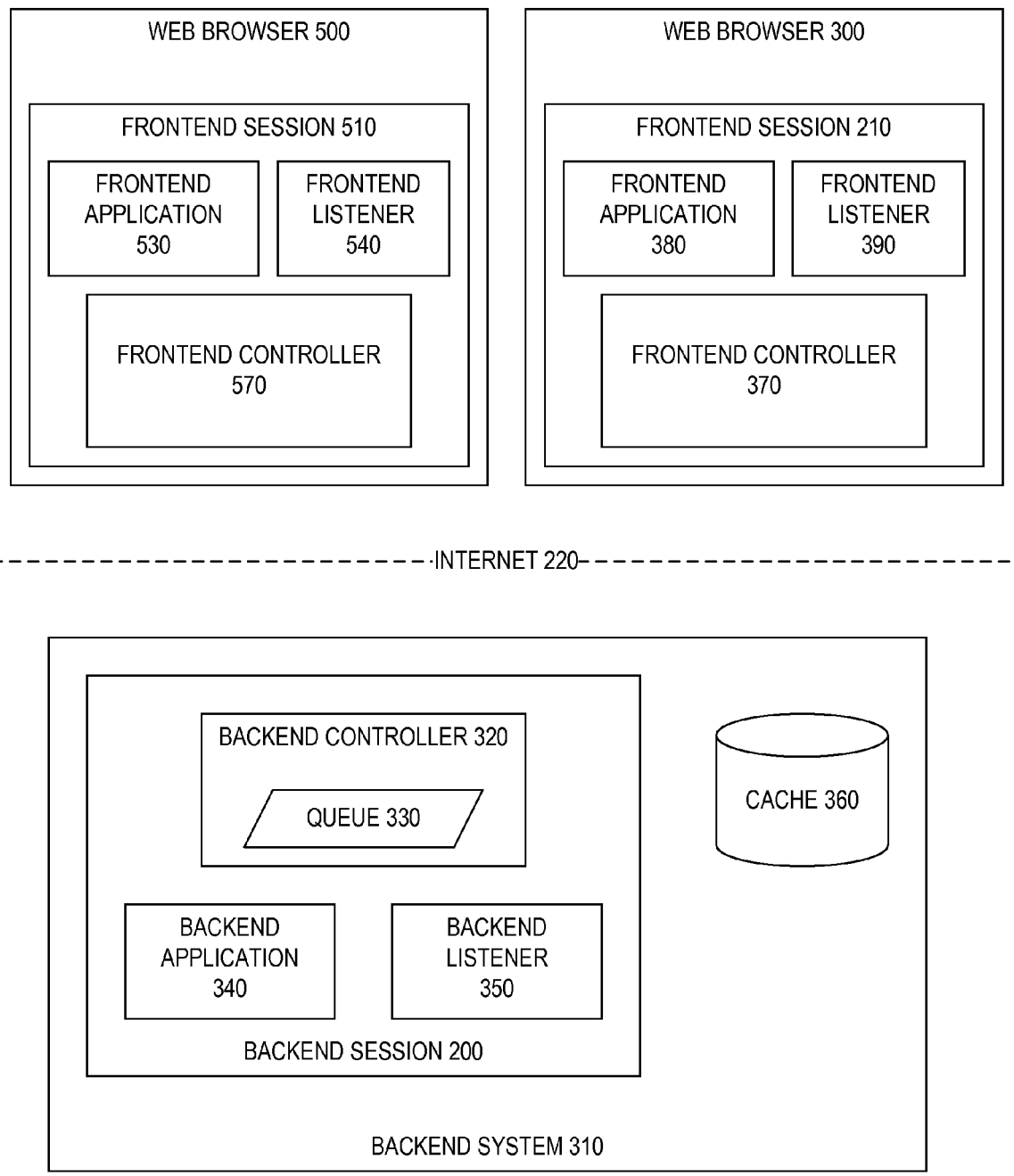
FIG. 5 is a block diagram that depicts a backend system and two Web browsers in accordance with an embodiment of the present invention.
Figure 6:
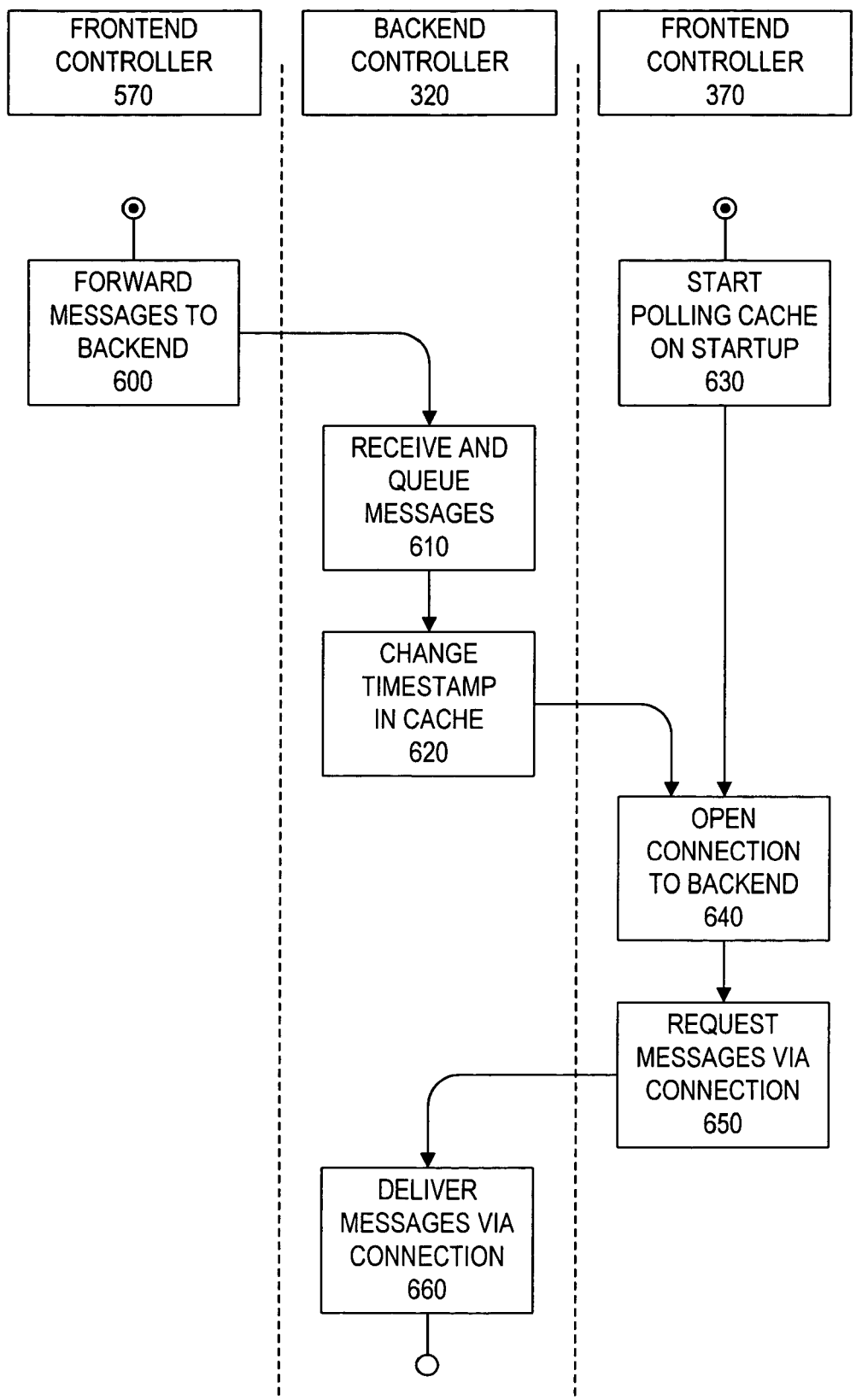
FIG. 6 is a sequence diagram that depicts a message passing protocol between two Web browsers via a backend system in accordance with an embodiment of the present invention.

FIGS. 5 and 6 depict a detailed view of a frontend to frontend messaging embodiment of the present invention. FIG. 5 shows two Web browsers (500 and 300) and a backend system (310). Backend system 310 and Web browser 300 are the same as described above. Web browser 500 is similar to Web browser 300, including a frontend session (510) comprising a frontend messaging controller (520), a frontend application (530) and a frontend listener (540).

As depicted in FIG. 6, steps 610, 620, 630, 640, 650 and 660 are functionally equivalent to steps 400, 410, 420, 430, 440 and 450, respectively. The only difference is that in step 600, frontend controller 570 initiates the process by forwarding one or more messages to backend controller 320. Frontend controller 570 may create and send the one or more messages in the same manner as described above with respect to step 440, with the one or more messages instructing backend controller 320 to forward the one or more messages to frontend controller 370, causing backend controller 320 to queue the one or more messages (step 610) and change the cache entry value (step 620) and so on.

Computer Architecture

Figure 7:
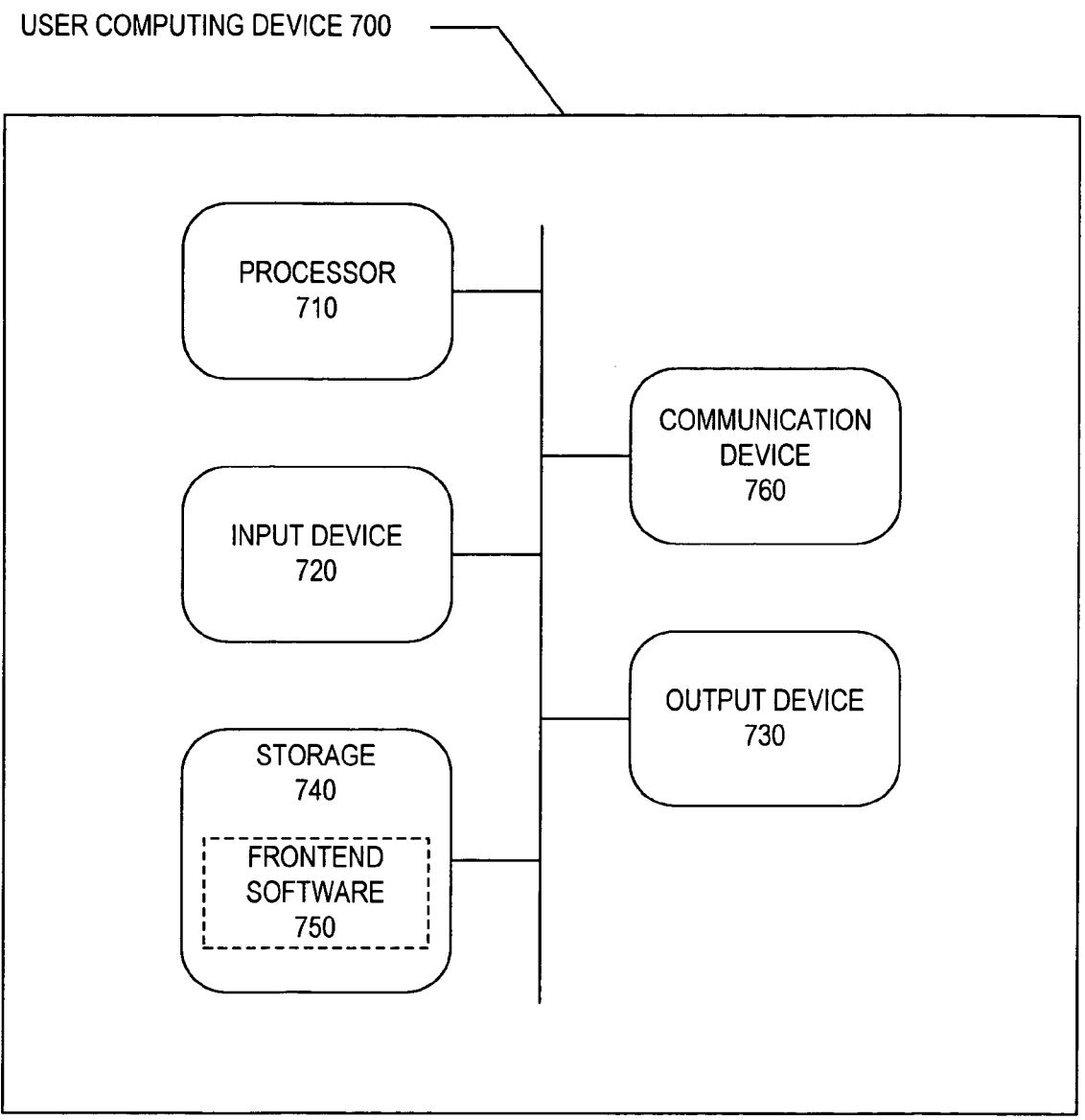
FIG. 7 is a block diagram that depicts a user computing device in accordance with an embodiment of the present invention.
Figure 8:
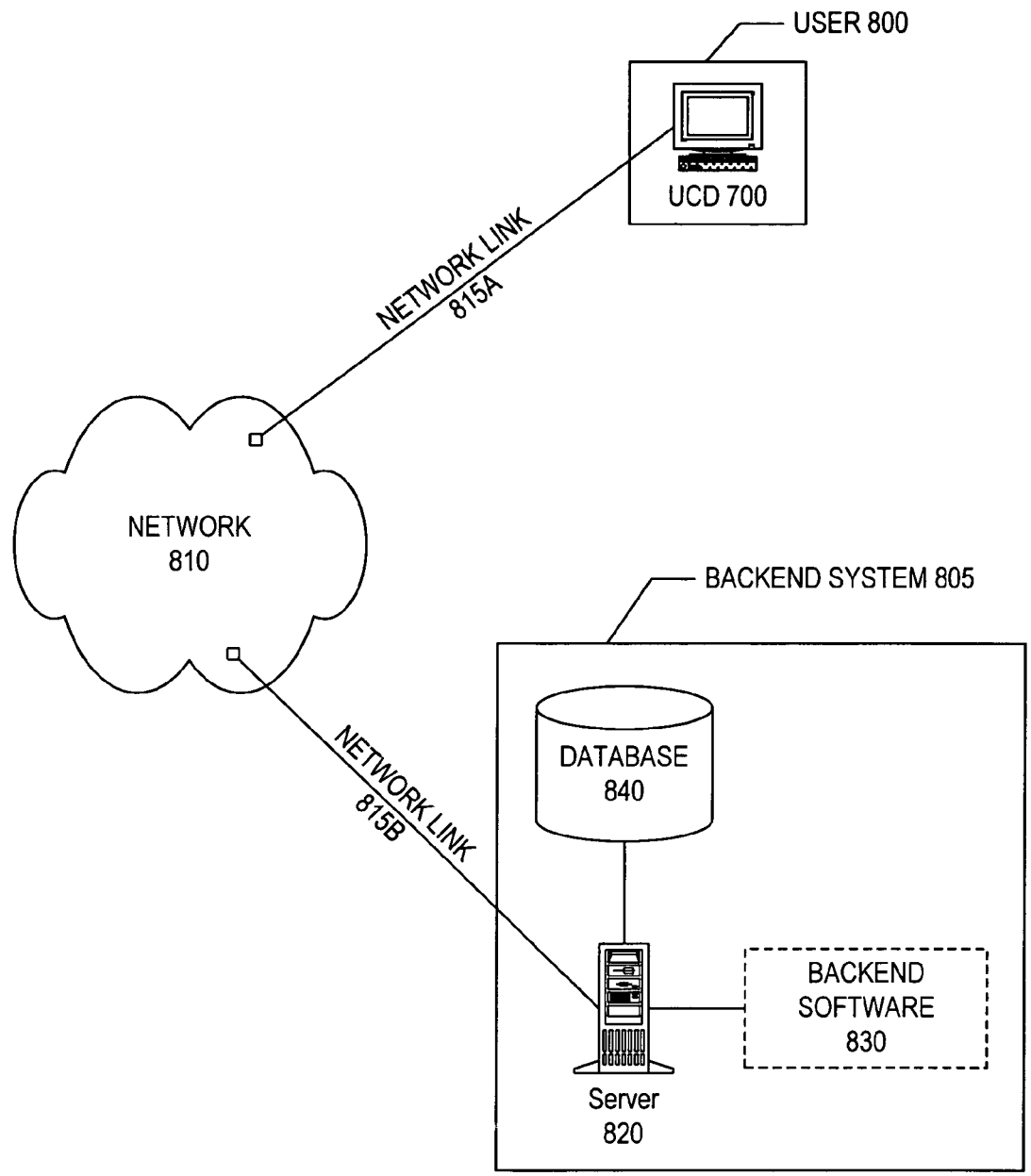
FIG. 8 is a block diagram that depicts a network architecture in accordance with an embodiment of the present invention.

FIGS. 7 and 8 illustrate the components of a basic computer and network architecture in accordance with an embodiment of the present invention. FIG. 7 depicts user computing device 700, which may be a personal computer, workstation, handheld personal digital assistant ("PDA"), or any other type of microprocessor-based device. User computing device 700 may include one or more of processor 710, input device 720, output device 730, storage 740, and communication device 760.

Input device 720 may include a keyboard, mouse, pen-operated touch screen or monitor, voice-recognition device, or any other device that provides input. Output device 730 may include a monitor, printer, disk drive, speakers, or any other device that provides output.

Storage 740 may include volatile and nonvolatile data storage, including one or more electrical, magnetic or optical memories such as a RAM, cache, hard drive, CD-ROM drive, tape drive or removable storage disk. Communication device 760 may include a modem, network interface card, or any other device capable of transmitting and receiving signals over a network. The components of user computing device 700 may be connected via an electrical bus or wirelessly.

Frontend software 750, which may be stored in storage 740 and executed by processor 710, may include, for example, application software implemented by a Web browser that embodies the functionality of the present invention (e.g., frontend controller 370, frontend application 380 and frontend listener 390). A Web browser may include Internet Explorer by Microsoft Corp. or Communicator® by Netscape Communications Corp., or any other software program that renders Web content.

FIG. 8 illustrates a network architecture in accordance with an embodiment of the present invention. According to one particular embodiment, when user 800 accesses a Web-based application hosted by backend system 805, frontend software 750 of user computing device 700 communicates with backend software 830 (e.g., backend controller 320, backend application 340 and backend listener 350) of server 820 via network link 815*a*, network 810, and network link 815*b*.

Network links 815 may include telephone lines, DSL, cable networks, T1 or T3 lines, wireless network connections, or any other arrangement that implements the transmission and reception of network signals. Network 810 may include any type of interconnected communication system (such as the Internet), which may implement any communications protocol (such as HTTP), which may be secured by any security protocol (such as HTTPS).

Server 820 includes a processor and memory for executing program instructions as well as a network interface, and may include a collection of servers. In one particular embodiment, server 820 may include a combination of servers such as a web application server (e.g., the SAP Web Application Server) and a database server. Database 840 may represent a relational or object database, and may be accessed via a database server.

User computing device 700 and server 820 may implement any operating system, such as Windows or UNIX. Frontend software 750 and backend software 830 may be written in any programming language, such as ABAP, C, C++, Java or Visual Basic, and may comprise the software implementing an SAP CRM Interaction Center Web Client application.

In other embodiments, application software embodying the functionality of the present invention may be deployed on a standalone machine or through a client/server arrangement, for example.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method for passing messages to a Web browser, comprising:
   receiving one or more messages at a backend system comprising backend controller and a storage queue, to be delivered to a Web browser session on a frontend system comprising a frontend controller, wherein the one or more messages are received at the backend controller and stored in the storage queue;
   providing notification by the backend controller of the backend system across a computer network to the Web browser session on the frontend system of the receipt of the one or more messages by changing a stored value in a server cache at the backend system by the backend controller, wherein the notification to the Web browser session is effected via a polling mechanism by the frontend controller in which the Web browser session monitors via HTTP requests sent over an HTTP connection formed for requesting the stored value, wherein the change in the stored value indicates that one or more messages are waiting to be delivered;
   receiving, by the frontend controller, the stored value from the backend controller based on the HTTP requests sent over the HTTP connection;
   determining by the frontend controller that the returned value has changed from a value returned in a previous polling cycle;
   in response to the determination that the returned value has changed, creating an HTTP request by declaring at the frontend controller an iframe to transfer the messages referred to in the notification, wherein the HTTP request contains a form including data fields with instructions instructing the backend controller regarding delivery of the messages;
   receiving at the backend controller of the backend system the HTTP request including the form from the Web browser session on the frontend system for the one or more messages in response to the provided notification, the HTTP request received across a computer network via an HTTP connection opened by the Web browser session on the frontend system by the frontend controller, wherein the form is dynamically created in a document object of the declared iframe with the instructions appended to the form in data fields of the form;
   reading the data fields of the form to retrieve the instructions for delivering the one or more messages by reading posted data fields and deserializing the instructions; and
   delivering the one or more messages from the backend system according to the instructions to the Web browser session on the frontend system via the HTTP connection in response to the HTTP request.

2. The method of claim 1 wherein the one or more messages includes a text message.

3. The method of claim 1, wherein the one or more messages includes a byte message.

4. The method of claim 1, wherein the one or more messages includes an object message.

5. The method of claim 1, wherein the one or more messages are placed in a queue before being delivered to the Web browser session.

6. The method of claim 1, wherein the polling mechanism includes changing a value to indicate the receipt of the one or more messages, the value being continually monitored by the Web Browser session.

7. The method of claim 6, wherein the value is a timestamp.

8. An apparatus for passing messages to a Web browser, comprising:
   a processor operating on a backend system, the backend system comprising a backend controller and a storage queue; and
   a memory, coupled to the processor, storing instructions to be executed by the processor to:
   receive one or more messages to be delivered to a Web browser session on a frontend system, the frontend system comprising a frontend controller;
   store the one or more received messages in the storage queue;
   provide notification across a computer network to the Web browser session of the receipt of the one or more messages by changing a stored value in a server cache at the backend system by the backend controller, wherein the notification to the Web browser session is effected via a polling mechanism by the frontend controller in which the Web browser session monitors via HTTP requests sent over an HTTP connection formed for requesting the stored value , wherein the change in the stored value indicates that one or more messages are waiting to be delivered;
   transmit the stored value from the server cache based on an HTTP request sent over an HTTP connection;
   in response to a determination by the frontend controller that the returned value has changed from a value returned in a previous polling cycle, receive at the processor a HTTP request having a form including data fields with instructions regarding delivery of the messages from the Web browser session on the frontend system for the one or more messages in response to the provided notification, the request received across a computer network via the HTTP connection opened by the Web browser session, wherein the form is dynamically created in a document object of a declared iframe with the instructions appended to the form in data fields of the form;

open the form to obtain the instructions regarding delivery of the message;

read the data fields of the opened form to retrieve the instructions for delivering the one or more messages by reading posted data fields and deserializing the instructions; and deliver the one or more messages to the Web browser session on the frontend system via the HTTP connection in response to the request.

9. The apparatus of claim 8, wherein the one or more messages are placed in a queue before being delivered to the Web browser session.

10. The apparatus of claim 8, wherein the polling mechanism includes changing a value to indicate the receipt of the one or more messages, the value being continually monitored by the Web browser session.

11. The apparatus of claim 10, wherein the value is a timestamp.

12. A system for passing messages to a Web browser, comprising:

a backend system that receives one or more messages to be delivered to a Web browser session on a frontend system, the backend system comprising a backend controller and a storage queue, and the frontend system comprising a frontend controller;

a database that stores a value;

means for providing notification across a computer network to the Web browser session of the receipt of the one or more messages by changing the stored value in a server cache at the backend system by the backend controller, wherein the notification to the Web browser session is effected via polling mechanism by the frontend controller in which the Web browser session continually monitors via HTTP requests sent over an HTTP connection formed for requesting the stored value, wherein the change in the stored value indicates that one or more messages are waiting to be delivered;

means for storing the one or more received messages in the storage queue;

means for receiving the stored value from the backend controller based on an HTTP request sent over an HTTP connection;

means for determining that the returned value has changed from a value returned in a previous polling cycle;

in response to a determination by the determining means that the returned value has changed from a value returned in a previous polling cycle, means for receiving, executing on the backend system, that receives an HTTP request having a form including data fields with instructions regarding delivery of the messages by the Web browser session for the one or more messages in response to the provided notification, the request received across a computer network via an HTTP connection opened by the Web browser session, wherein the form is dynamically created in a document object of a declared iframe with the instructions appended to the form in data fields of the form;

means for opening the form to obtain the instructions regarding delivery of the message;

means for reading data fields of the opened form to retrieve the instructions for delivering the one or more messages by reading posted data fields and deserializing the instructions; and means for delivering the one or more messages to the Web browser session via the HTTP connection in response to the request.

13. The system of claim 12, wherein the one or more messages are placed in a queue before being delivered to the Web browser session.

14. The system of claim 12, wherein the polling mechanism includes changing a value to indicate the receipt of the one or more messages, the value being continually monitored by the Web browser session.

15. The system of claim 14, wherein the value is a timestamp.

16. A computer-implemented method for passing messages to a Web browser, comprising:

receiving by a first server, including a first controller and a storage queue, one or more messages to be delivered to a Web browser session executing on a second server including a second controller, wherein the one or more messages are received by the first controller and stored in the storage queue;

providing notification by the first server across a computer network to the Web browser session of the receipt of the one or more messages by changing a stored value in a server cache on the first server, wherein the notification to the Web browser session is effected via a polling mechanism by the second controller in which the Web browser session continually monitors via HTTP requests sent over an HTTP connection formed for requesting the stored value, wherein the change in the stored value indicates that one or more messages are waiting to be delivered;

receiving, by the second controller, the stored value from the backend controller based on the HTTP requests sent over the HTTP connection;

determining, by the second controller, that the returned value has changed from a value returned in a previous polling cycle;

in response to the determination that the returned value has changed, creating an HTTP request by declaring at the frontend controller an iframe to transfer the messages referred to in the notification, wherein the HTTP request contains a form including data fields with instructions instructing the first controller regarding delivery of the messages, wherein the form is dynamically created in a document object of a declared iframe with the instructions appended to the form in data fields of the form;

receiving at the first controller the HTTP request including the form by the Web browser session for the one or more messages in response to the provided notification, the HTTP request received across a computer network via an HTTP connection opened by the Web browser session;

reading the data fields of the form to retrieve the instructions for delivering the one or more messages by reading posted data fields and deserializing the instructions; and delivering the one or more messages to the Web browser session via the HTTP connection in response to the HTTP request.

17. The method of claim 1, comprising:

opening an HTTP connection by the frontend system to receive the one or more messages causing the notification.

18. The apparatus of claim 8, the memory further comprising:

storing computer instructions for causing the processor to:

open an HTTP connection by the frontend system to receive the one or more messages causing the notification.

19. The computer-implemented method of claim 16, comprising:

in response to receiving the notification, opening an HTTP connection by the web browser session at a frontend system to receive the one or more messages from the backend system.

20. The method of claim 1, wherein the HTTP connection is opened by the Web browser session to receive the one or more messages related to the provided notification.

21. The apparatus of claim 8, wherein the HTTP connection is opened by the Web browser session to receive the one or more messages related to the provided notification.

22. The computer-implemented method of claim 16, wherein the HTTP connection is opened by the Web browser session to receive the one or more messages related to the provided notification.

* * * * *